UNITED STATES PATENT OFFICE.

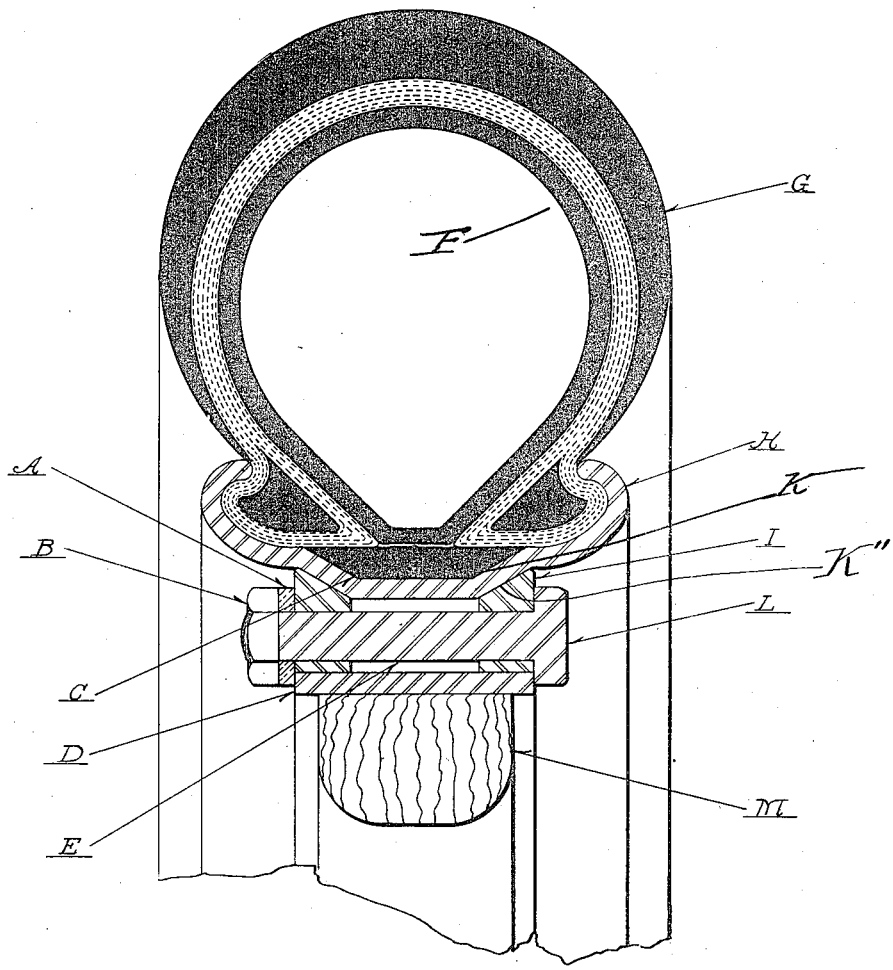

ARTHUR L. LOCKWOOD, OF JACKSON, MICHIGAN.

PNEUMATIC-TIRE RIM.

953,477. Specification of Letters Patent. Patented Mar. 29, 1910.

Application filed January 14, 1907, Serial No. 352,186. Renewed December 7, 1909. Serial No. 531,883.

*To all whom it may concern:*

Be it known that I, ARTHUR L. LOCKWOOD, a citizen of the United States, residing at Jackson, in the county of Jackson and State of Michigan, have invented certain new and useful Improvements in Pneumatic-Tire Rims, of which the following is a specification.

My invention relates to improvements in pneumatic tire rims, and has for its primary object, to render the outer casing or tire waterproof so that it will be impossible for moisture to obtain access to the inner tube.

Another object of my invention, is the provision of improved means for adjustably and removably securing the rim upon the wheel, so that by the removal of a few bolts, the rim and tire, intact, may be removed from the wheel.

A further object of my invention, is the provision of a rim and a pneumatic tire of simple and practical construction, and which will be all the more durable by reason of the water tight arrangement of the parts.

With these and other objects in view, my invention consists of the rim, the usual divided outer casing and the inner tube mounted thereon, and a waterproof gasket or packing interposed between the adjoining edges of the outer casing and the rim, so as to form a watertight joint therebetween; and the invention further embodies certain other novel features of construction, combination and arrangement of parts substantially as herein disclosed.

The figure is a cross sectional view of a tire and rim embodying the features of my invention.

The divided outer casing G, of my tire may be of any preferred form, and the inner tube F, is of the usual type. The rim of the tire has the usual inturned locking edges H, and in addition to this, is formed with the central depression or circumferential groove K, in which closely fits the annular gasket or packing ring C, which is made of non corrosive elastic material, preferably rubber. The trough-like depression in the rim is formed with inclined side walls, and as the rim is of practically the same thickness throughout, similar raised or inclined faces K″ are provided on the outer periphery of the rim. The inner edges of the outer casing rest flush upon the packing ring, so that when the inner tube is inflated, the edges are held in close contact with the packing and a perfectly watertight joint is thereby assured, so that no moisture may leak between the rim and outer casing, to the inner tube, and the life of the inner tube is much prolonged since it is always kept in a dry and wholesome condition.

The rim carrying the tire, is secured upon the wheel in the following manner: Secured upon the felly M, is the usual flat rim or tread D, and mounted upon said rim, are the pair of opposing taper rings I, the taper faces of which, engage the inclined faces K″, upon the rim proper, so that the rim proper is thereby supported and held upon the band or tread by means of the taper rings, bolts L, being passed through the rings to secure them together. The heads of the bolts L engage the edges of the band or tread, and washers A, on the opposite end of each bolt, likewise engage the edges of the tread to prevent lateral displacement of the taper rings, securing nuts B, being mounted upon the extreme ends of the bolts. It will thus be seen that by the removal of these bolts, the taper rings, likewise the rim and tire may be entirely removed from the wheel.

From the foregoing description taken in connection with the drawings, it will be evident that I have provided a tire having a watertight outer casing, and one which accomplishes all the results herein set forth as the objects of the invention.

I claim:

1. The combination with the felly of a wheel and a tread thereon, oppositely disposed taper rings seated on said tread, securing bolts passing through the rings with their heads overlapping the tread to prevent lateral movement of the rings on the tread, a rim having a central depressed portion with inclined edges, the inner periphery of the rim having like angular depressed portions, said angular portions resting on the taper rings.

2. The combination with the felly of a wheel and a tread thereon, oppositely disposed taper rings seated on said tread, securing bolts passing through the rings with their heads overlapping the tread to prevent lateral movement of the rings on the tread, a rim having a central depressed portion with inclined edges, the inner periphery of the rim having like angular depressed portions, said angular portions resting on the taper rings, a packing band seated in the depressed portion of the rim, an outer casing engaging with the rim, and an inner tube adapted to force the edges of the casing in close engagement with the packing band.

In testimony whereof I affix my signature in presence of two witnesses.

ARTHUR L. LOCKWOOD.

Witnesses:
FRANK L. BLACKMAN,
J. H. McILVAIN.